(12) United States Patent
Hong et al.

(10) Patent No.: US 12,365,128 B2
(45) Date of Patent: Jul. 22, 2025

(54) METHOD OF FORMING AUTOMOBILE SOUND ABSORBING MEMBER THROUGH MOLDING

(71) Applicant: NVH KOREA, INC., Ulsan (KR)

(72) Inventors: Jun Ho Hong, Hwaseong-si (KR); Joo Kwon Han, Hwaseong-si (KR)

(73) Assignee: NVH KOREA, INC., Ulsan (KR)

( * ) Notice: Subject to any disclaimer, the term of this patent is extended or adjusted under 35 U.S.C. 154(b) by 47 days.

(21) Appl. No.: 18/036,948

(22) PCT Filed: Oct. 21, 2021

(86) PCT No.: PCT/KR2021/014843
§ 371 (c)(1),
(2) Date: May 15, 2023

(87) PCT Pub. No.: WO2022/108138
PCT Pub. Date: May 27, 2022

(65) Prior Publication Data
US 2024/0017474 A1 Jan. 18, 2024

(30) Foreign Application Priority Data
Nov. 17, 2020 (KR) .................. 10-2020-0153320

(51) Int. Cl.
*B29C 51/00* (2006.01)
*B29C 51/02* (2006.01)
(Continued)

(52) U.S. Cl.
CPC ............ *B29C 51/004* (2013.01); *B29C 51/02* (2013.01); *B29C 51/10* (2013.01); *B29C 51/145* (2013.01);
(Continued)

(58) Field of Classification Search
CPC ....... B29C 51/004; B29C 51/02; B29C 51/10; B29C 51/145; B29C 51/428;
(Continued)

(56) References Cited

U.S. PATENT DOCUMENTS 4,131,664 A 12/1978 Flowers et al.
4,517,236 A * 5/1985 Meeker ................ B32B 3/02
428/192

(Continued)

FOREIGN PATENT DOCUMENTS

JP 06-032022 U 4/1994
JP 2014-516818 A 7/2014
(Continued)

OTHER PUBLICATIONS

Office Action for Korean Application No. 10-2020-0153320 mailed on Apr. 19, 2021, with its English summary, 10 pages.
(Continued)

*Primary Examiner* — George R Koch
*Assistant Examiner* — Christopher C Caillouet
(74) *Attorney, Agent, or Firm* — Christian S. Hans; Bret E. Field; Bozicevic, Field & Francis LLP

(57) ABSTRACT

Disclosed is a method for producing an automobile sound absorbing member through molding. In the method, a first fibrous layer and a second fibrous layer are bonded to each other and molded at the same time, so that a working process and a process cycle are simplified, thereby improving production speed and reducing investment for equipment and facility. The method includes (a) preparing a first fibrous layer and a second fibrous layer, (b) providing an adhesive member between the first fibrous layer and the second fibrous layer and placing an aggregate of the first fibrous layer, adhesive member, and the second fibrous layer in a molding machine, and (c) pressing an upper mold and a
(Continued)

lower mold of the molding machine so that the first fibrous layer and the second fibrous layer are bonded and molded into a molded body.

5 Claims, 4 Drawing Sheets

(51) Int. Cl.
| | |
|---|---|
| *B29C 51/10* | (2006.01) |
| *B29C 51/14* | (2006.01) |
| *B29C 51/42* | (2006.01) |
| *B32B 5/02* | (2006.01) |
| *B32B 7/12* | (2006.01) |
| *B32B 27/08* | (2006.01) |
| *B32B 27/12* | (2006.01) |
| *B32B 27/28* | (2006.01) |
| *B32B 27/32* | (2006.01) |
| *B29L 31/00* | (2006.01) |
| *B29L 31/30* | (2006.01) |

(52) U.S. Cl.
CPC .......... *B29C 51/428* (2013.01); *B32B 5/022* (2013.01); *B32B 7/12* (2013.01); *B32B 27/08* (2013.01); *B32B 27/12* (2013.01); *B32B 27/281* (2013.01); *B32B 27/32* (2013.01); *B29C 2791/006* (2013.01); *B29C 2791/007* (2013.01); *B29C 2793/009* (2013.01); *B29K 2995/0002* (2013.01); *B29L 2031/3011* (2013.01); *B29L 2031/3014* (2013.01); *B29L 2031/732* (2013.01); *B32B 2250/05* (2013.01); *B32B 2260/023* (2013.01); *B32B 2260/046* (2013.01); *B32B 2307/102* (2013.01); *B32B 2307/72* (2013.01); *B32B 2307/7376* (2023.05); *B32B 2605/08* (2013.01)

(58) Field of Classification Search
CPC ........ B29C 2791/006; B29C 2791/007; B29C 2793/009; B29C 43/14; B29C 43/146; B29C 70/46; B29C 70/545; B29C 2043/144; B29C 2043/148; B29C 2793/0009; B29C 65/48; B29C 65/70; B32B 5/022; B32B 7/12; B32B 27/08; B32B 27/12; B32B 27/281; B32B 27/32; B32B 2250/05; B32B 2260/023; B32B 2260/046; B32B 2307/102; B32B 2307/72; B32B 2307/7376; B32B 2605/08; B32B 5/26; B32B 27/306; B32B 27/34; B32B 27/36; B32B 2262/0246; B32B 2262/0253; B32B 2262/0261; B32B 2262/0284; B32B 2262/062; B32B 2605/003; B29K 2995/0002; B29L 2031/3011; B29L 2031/3014; B29L 2031/732; B29L 2031/3005; B29L 2031/3055

See application file for complete search history.

(56) References Cited

U.S. PATENT DOCUMENTS

| | | | | |
|---|---|---|---|---|
| 5,087,311 | A * | 2/1992 | Elliott | B29C 66/72143 |
| | | | | 156/212 |
| 6,103,180 | A * | 8/2000 | Haeseker | D04H 1/4291 |
| | | | | 264/37.17 |
| 2014/0302285 | A1* | 10/2014 | Ikeji | B60N 3/042 |
| | | | | 428/161 |
| 2019/0062991 | A1* | 2/2019 | Ogawa | B32B 5/24 |
| 2020/0316906 | A1* | 10/2020 | Yamamuro | B32B 5/08 |

FOREIGN PATENT DOCUMENTS

| | | | |
|---|---|---|---|
| KR | 10-2004-0003785 A | | 1/2004 |
| KR | 10-0921073 A | | 9/2009 |
| KR | 2010-0050924 A | * | 5/2010 |
| KR | 10-1054752 B1 | | 8/2011 |
| KR | 10-1980336 B1 | | 5/2019 |
| KR | 10-2294294 B1 | | 8/2021 |

OTHER PUBLICATIONS

Written Decision on Registration for Korean Application No. 10-2020-0153320 mailed on Aug. 17, 2021, with its English summary, 2 pages.
English Translation of International Search Report for PCT Application No. PCT/KR2021/014843 mailed Feb. 3, 2022, 7 pages.
Extended European Search Report for European Application No. 21894910.5 mailed Feb. 21, 2024, 6 pages.

* cited by examiner

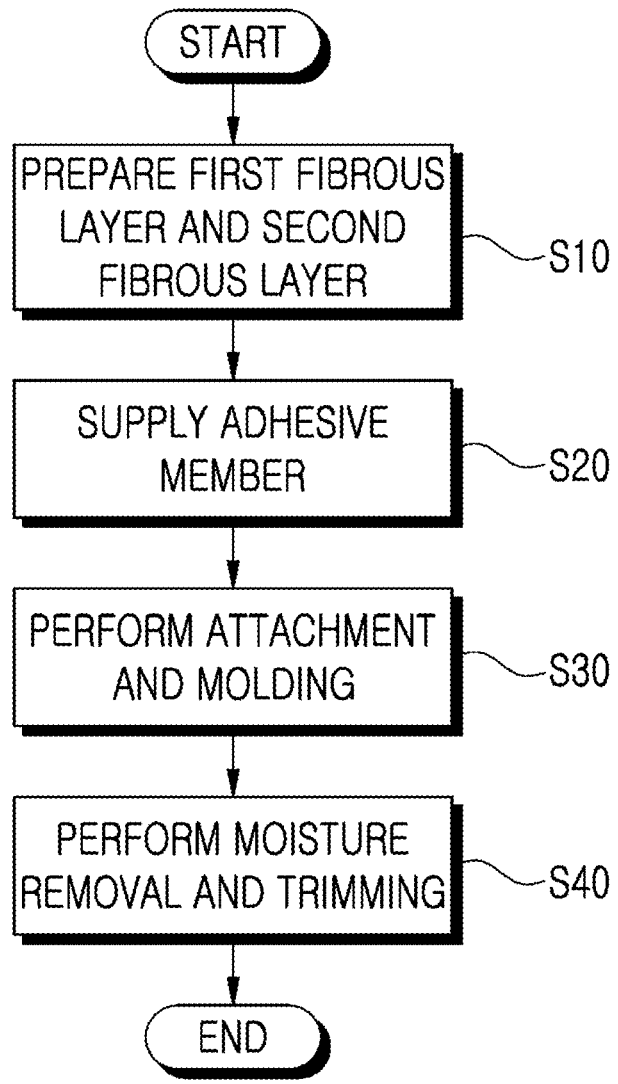

[FIG. 2]
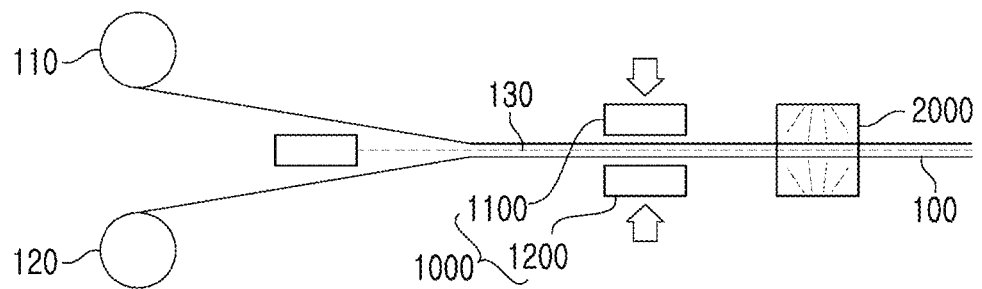
[FIG. 3]
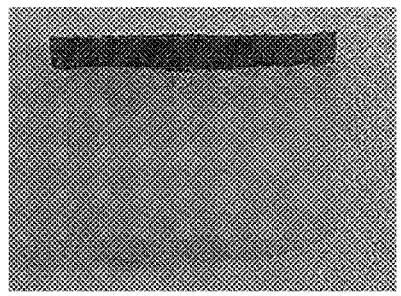

[FIG. 4]
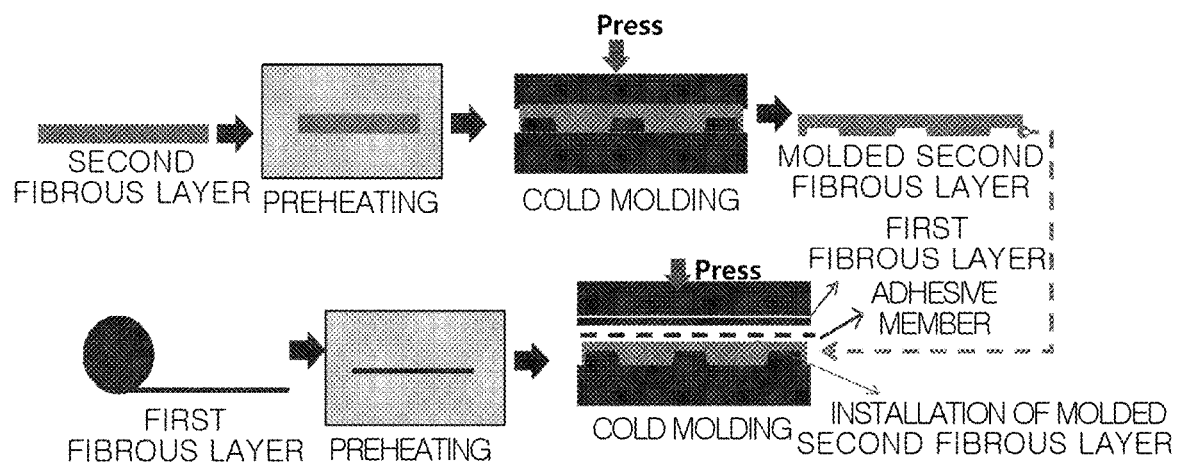
[FIG. 5]
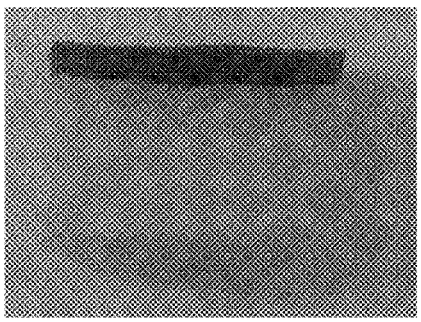

[FIG. 6]
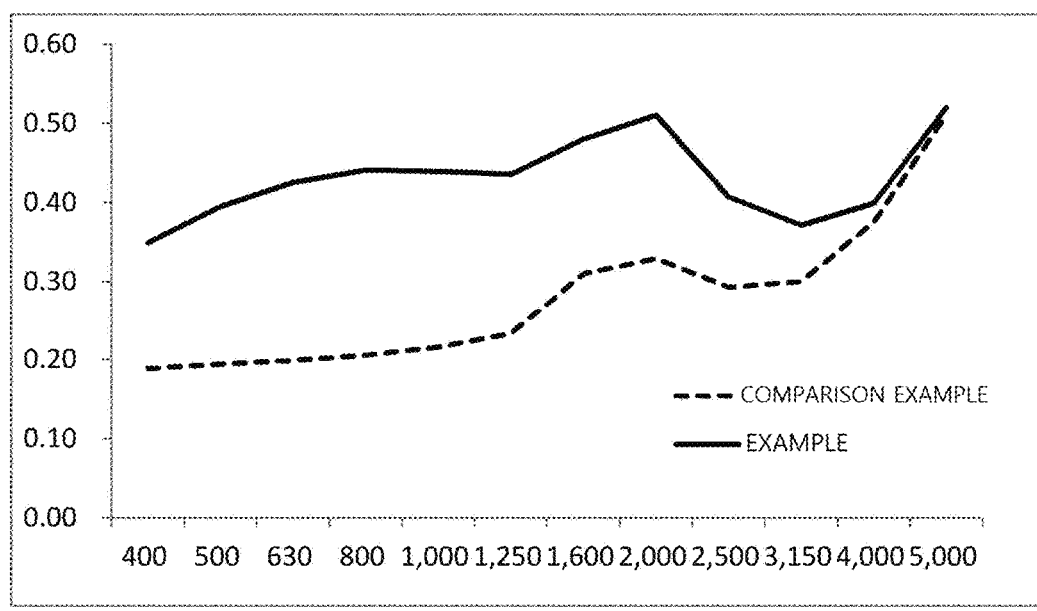

METHOD OF FORMING AUTOMOBILE SOUND ABSORBING MEMBER THROUGH MOLDING

CROSS-REFERENCE TO RELATED APPLICATION

This Application is a Section 371 National Stage Application of International Application No. PCT/KR2021/014843, filed Oct. 21, 2021, the contents of which is hereby incorporated by reference in its entirety.

TECHNICAL FIELD

The description in the present specification relates to a method of producing a sound-absorbing member with improved sound-absorbing performance for automobiles through molding.

BACKGROUND ART

Unless otherwise stated herein, the statements in this specification merely provide background information related to the present disclosure and do not constitute prior art.

The internal/external noise that enters the interior of a vehicle through various routes during vehicle driving causes discomfort to the driver and the occupants. These noises mainly include noise generated from the engine and noise generated from the vehicle exhaust. As a method of solving the problem of noise entering the interior of a vehicle, sound absorbing materials are applied to various vehicle components, such as a headliner, a door trim, a rear shelf, a truck mat, a car mat, and a bonnet.

For a sound absorber for a vehicle, Patent Document 1 discloses a method including the steps of: cutting a back felt containing low-melting fiber; preheating the back felt; bonding the back felt and a piece of carpet fabric to each other by placing the carpet fabric on the surface of the back felt and inserting the resulting stack of the carpet fabric and the back felt into a mold for molding so that the melted low-melting fiber flows into the carpet fabric during the preheating; and cooling a molded body made of the carpet fabric and the back felt.

According to Patent Document 1, the felt is separately preheated and then molded and cooled in the mold. Therefore, the appearance quality and sound absorption performance are speed is slow because the deteriorated, and the production production method is complicated.

DISCLOSURE

Technical Problem

The objective of the present disclosure is to provide a method of molding a sound-absorbing material for automobiles, the method being simple and being capable of producing a sound absorbing member with good surface quality and improved sound-absorbing performance.

Technical problems that can be solved by the present disclosure are not limited to the above-described objective, and other technical problems that are not described herein can also be solved by the present disclosure.

Technical Solution

According to one embodiment of the present disclosure, there is provided a method of molding a sound absorbing material for a vehicle, the method including: (a) preparing a first fibrous layer and a second fibrous layer; (b) providing an adhesive member between the first fibrous layer and the second fibrous layer and placing an aggregate of the first fibrous layer, adhesive member, and the second fibrous layer in a molding machine; and (c) pressing an upper mold and a lower mold of the molding machine so that the first fibrous layer and the second fibrous layer are bonded and molded into a molded body.

In addition, in step (a), each of the first fibrous layer and the second fibrous layer includes 50% to 95% by weight of at least one base fiber selected from polyethylene terephthalate, polypropylene, polyacrylate, nylon, and cotton and 5% to 50% by weight of a binder fiber having a melting point of 200° C. or below, the first fibrous layer has an areal density of 600 to 1400 $g/m^2$, and the second fibrous layer has an areal density of 600 to 2000 $g/m^2$.

In addition, in step (b), the adhesive member is composed of at least one layer, is made of at least one selected from polyethylene, polypropylene, ethylene vinyl acetate copolymer, polyamide, and low-melting-point polyethylene terephthalate, and has a thickness of 30 to 200 μm.

In addition, in step (c), the upper mold may perform a vacuuming process for 40 to 50 seconds under a temperature condition of 10° C. to 100° C.

In addition, in step (c), the lower mold may perform a steaming process and a vacuuming process at least twice.

In addition, in the steam process, steam or hot air of 100° C. to 200° C. may be supplied for 5 to 15 seconds at a pressure of 1 to 5 bar.

In addition, in step (c), the vacuum process may be performed for 1 to 15 seconds under a temperature condition of 100° C. to 200° C.

In addition, after step (c), (d) trimming may be performed after removing moisture remaining on the surface of the molded body discharged the molding machine.

Advantageous Effects

In the automobile sound absorber molding method according to one embodiment disclosed in the present specification, the bonding of the first fibrous layer and the second fibrous layer and the molding are performed at the same time. This simplifies the working process and process cycle, thereby improving the production speed and reducing the cost of investment for equipment.

In addition, by processing the first and second fibrous layers at different temperatures with different processes, instead of using a conventional method performing cold pressing after preheating the first and second fibrous layers, the method has the effect of improving the appearance quality and sound absorbing performance while minimizing damage to the surface of the first fibrous layer.

In addition, since vertical fiber is used for the second fibrous layer, the thickness of the second fibrous layer can be reduced, resulting in reduction in weight of a final product (i.e., a sound absorber).

DESCRIPTION OF DRAWINGS

FIG. 1 is a process flowchart illustrating a method of molding a sound absorbing material for a vehicle according to an embodiment in the present disclosure;

FIG. 2 is a schematic view illustrating a method of molding a sound absorbing material for a vehicle according to an embodiment in the present disclosure;

FIG. 3 is a photograph illustrating a sound absorber according to Example 1;

FIG. 4 is a schematic view illustrating a method of molding a sound absorbing material according to Comparative Example 1;

FIG. 5 is a photograph illustrating a sound absorber of Comparative Example 1; and FIG. 6 is a graph showing a result of evaluation of sound absorbing performance according to Experimental Example 1.

BEST MODE

The advantages and features of the present disclosure and the manner of achieving them will become apparent with reference to embodiments described in detail below and the accompanying drawings. The invention may, however, be embodied in many different forms and should not be construed as being limited to the embodiments set forth herein. Rather, these embodiments are provided so that the invention will be thorough and complete and will fully convey the concept of the invention to those skilled in the art. Thus, the invention will be defined only by the scope of the appended claims. Like reference numbers refer to like elements throughout the description herein and the drawings.

Further, in describing embodiments of the present disclosure, well-known functions or constructions will not be described in detail since they may unnecessarily obscure the gist of the present disclosure. The following terms are defined in consideration of the functions in the embodiments of the present disclosure and thus may vary according to the intentions of users, operators, or the like. Therefore, the definition of each term should be interpreted based on the contents throughout this specification.

Hereinafter, a method of molding a sound absorbing material for a vehicle according to the present disclosure will be described in detail with reference to the accompanying drawings.

FIG. 1 is a process flowchart illustrating a method of molding a sound absorbing material for a vehicle according to an embodiment of the present disclosure, and IG. 2 is a schematic view illustrating a method of molding a sound absorbing material for a vehicle according to an embodiment of the present disclosure.

Referring to FIGS. 1 and 2, first, a first fibrous layer 110 and a second fibrous layer 120 are prepared (S10).

Each of the first fibrous layer 110 and the second fibrous layer 120 may contain 50% to 95% by weight of at least one base fiber selected from polyethylene terephthalate (PET), polypropylene (PP), polyacrylate (PA), nylon (nylon), and cotton and 5% to 50% by weight of a binder fiber having a melting point of 200° C. or below. Here, as the binder fibers, polyethylene (PE), polypropylene (PP), ethylene-vinyl acetate copolymer (EVA), polyamide (PA), and low melting point polyethylene terephthalate (LM PET) may be used.

In the present disclosure, the term "nylon" refers to synthetic polymer based on aliphatic or semi-aromatic polyamide, and the term "cotton" refers to raw cotton, cotton cloth, and cotton fibers obtained by processing cotton as a raw material. Specifically, in this embodiment, the first fibrous layer

110 is composed of 50% to 95% by weight of the base fiber and 5% to 50% by weight of the binder fiber. Preferably, the first fibrous layer 110 includes 55% to 65% by weight of the base fiber and 33% to 45% by weight of the binder fiber. The first fibrous layer may be manufactured by any one method selected from a needle punching method, an air-laid method, a fiber blow injection molding (FBIM) method, and a vertical method. The areal density of the first fibrous layer 110 may be in the range of 600 to 1400 g/m$^2$, and preferably in the range of 800 to 1200 g/m$^2$.

On the other hand, on one surface of the first fibrous layer 110, any one selected from elastic rubber such as latex, a polyethylene coating layer, compressed fiber, breathable film, non-woven fabric, and adhesive powder may be provided according to the desired function such as shaping, sound absorbing, insulating, or adhesion.

The second fibrous layer 120 is composed of 50% to 95% by weight of the base fiber and 5% to 50% by weight of the binder fiber. The Second fibrous layer may be manufactured by any one method selected from a needle punching method, an air-laid method, a fiber blow injection molding (FBIM) method, m and a vertical method. The second fibrous layer 120 consists of a vertical fiber having a verticality of about 40° to 90° which has excellent elasticity and breathability, thereby facilitating a molding process to be described later. The second fibrous layer 120 has an areal density in the range of 600 to 2000 g/m$^2$ and preferable in the range of 800 to 1400 g/m$^2$. In addition, unlike a conventional method in which the second fibrous layer has to have a thickness larger than or equal to the maximum thickness of an application component for good adhesion with the first fibrous layer 110, according to the present disclosure, sufficient adhesive strength between the second fibrous layer and the first fibrous layer 110 can be obtained even when the second fibrous layer is thin. Since the thickness of the second fibrous layer is reduced, the weight of the sound absorbing member, which is the final product, can be reduced.

Next, the adhesive member 130 is provided between the first fibrous layer 110 and the second fibrous layer 120 and then an aggregate of the first fibrous layer 110, the adhesive member, and the second fibrous layer 120 is placed in a molding machine 1000 (S20).

That is, an object in which the adhesive member 130 is provided between the first fibrous layer 110 and the second fibrous layer 120 is placed in the molding machine 1000. In this case, the aggregate may be a stacked structure in which the second fibrous layer 120, the adhesive member 130, and the first fibrous layer 110 are stacked in this order from the bottom.

The adhesive member 130 is not significantly limited in specific material as long as the material has a melting point of 200° C. or below, but any at least one material selected from polyethylene (PE), polypropylene (PP), ethylene vinyl acetate copolymer (EVA), polyamide (PA), and low-melting polyethylene terephthalate (LM PET) may be used. Preferably, either polyethylene (PE) or polyamide (PA) is used. The adhesive member 30 may be applied in various forms such as a film, a liquid adhesive, a fiber, a hot melt, an adhesive fiber, a powder, a coating layer, etc. to facilitate adhesion of the first fibrous layer 110 and the second fibrous layer 120. As the film, a breathable film may be used.

In this embodiment, the adhesive member 130 may be formed as at least one layer. Preferably polyamide, the adhesive member 130 may be a three-layer film in which polyethylene is provided as an intermediate layer and polyamide is provided on and under the polyethylene. In this case, the thickness of the adhesive member 130 may be in the range of 30 to 200 μm. Preferably, the thickness is 50 μm. When the thickness of the adhesive member 130 is smaller than 30 μm, the adhesive strength can be easily lost. On the other hand, when the thickness exceeds 200 μm, the thickness of the final molded body 100 becomes excessively thick, which is not preferable in terms of its use.

Next, an upper mold 1100 and a lower mold 1200 of the molding machine 1000 are pressed against each other to bond and mold the first fibrous layer 110 and the second fibrous layer 120 to each other (S30).

The molding machine 1000 is composed of the upper mold 1100 for molding the first fibrous layer 110 and the lower mold 1200 for molding the second fibrous layer 120, and the upper mold 1100 and the lower mold 1200 has at least one hole serving as an air intake passage on the surface thereof. The upper mold 1100 and the lower mold 1200 of the molding machine 1000 hot presses the first fibrous layer 110 and the second fibrous layer 120 in a direction perpendicular to the ground surface for 40 to 50 seconds, and more preferably for 45 seconds to perform bonding and molding simultaneously.

On the other hand, the upper mold 1100 and the lower mold 1200 each perform different processes, but the upper mold 1100 performs a vacuuming process, and the lower mold 1200 performs a steaming process and a vacuuming process at least two times.

The vacuuming process performed by the upper mold 1100 is a process of continuously suctioning air for 40 to 50 seconds and preferably for 43 to 47 seconds through the hole(s) formed on the surface of the upper mold 1100. This vacuuming process may be carried out at a temperature in the range of 10 to 100° C., preferably in the range of 30° C. to 70° C., and most preferably in the range of 40° C. to 60° C., so that the temperature of the upper mold 1100 is not excessively high because the excessively high temperature may cause damage to the surface of the first fibrous layer 110. As described above, since the first fibrous layer 110 is molded in the vacuuming process under a low temperature condition, damage to the surface of the first fibrous layer 110 is minimized. Therefore, the appearance quality and the sound absorption performance of the product are improved.

The vacuuming process performed by the lower mold 1100 is a process of continuously suctioning air for 1 to 15 seconds and preferably for 5 to 10 seconds through the hole(s) formed on the surface of the lower mold 1200. This vacuuming process may be carried out at a temperature in the range of 100 to 200° C. and preferably in the range of 130° C. to 170° C. so that damage to the surface of the second fibrous layer 1200 can be prevented and the adhesive member 130 can be melted.

The steaming process performed by the lower mold 1200 is performed by supplying steam or hot air of 100° C. to 200° C., preferably 130° C. to 170° C., and most preferably 140° C. to 160° C. at a pressure of 1 to 5 bar and preferably 2 to 4 bar for a period of 5 to 15 seconds.

In the present embodiment, the lower mold 1200 may sequentially perform a first steaming process, a first vacuuming process, a second steaming process, and a second vacuuming process.

For example, the first steaming process may be carried out by ejecting steam or hot air of 140° C. to 160° C. at a pressure of 2 to 4 bar for 8 to 12 seconds, and the first vacuuming process may be performed for 8 to 12 seconds. The second steaming process may be performed by ejecting steam or hot air of 140° C. to 160° C. at a pressure of 2 to 4 bar for 3 to 7 seconds, and the second vacuuming process may be performed for 3 to 7 seconds. The first vacuuming process and the second vacuuming process may be performed in a temperature range of 140° C. to 160° C., and specifically, the temperature of the lower mold 1200 may be in the range of 140° C. to 160° C.

In the process of bonding and molding the fiber with the above-described molding machine 1000, the first fibrous layer 110 placed in the molding machine 1000 is seated and molded by the vacuuming process performed by the upper mold 1100, and the second fibrous layer 120 is bonded to the first fibrous layer and molded by the lower mold 1200 in a manner that the adhesive material 130 is melted by the steaming process of the lower mold 1200 to be bonded the first fibrous layer 110 and the second fibrous layer 120 is molded by the vacuuming process. In addition, during the vacuuming process, the second fibrous layer 120 heated by the steaming process may be cooled.

Finally, after removing moisture remaining on the surface of the molded body 100 in the molding machine 1000, the surface of the molded body 100 is trimmed (S40).

In step S30, a hot air blower 2000 may blow room temperature air or mildly heated air to remove the moisture remaining on the surface of the molded body 100 obtained in step S30, and then the molded body 100 is trimmed into a desired shape. The molded body 100 may be a sound-absorbing member for use in the interior of a vehicle.

Preparation Example 1. Preparation of First Fibrous Layer

After mixing 60% by weight of polyethylene terephthalate (PET) and 40% by weight of a binder fiber, a needle punching process was performed on the mixture to produce a first fibrous layer having an areal density of 800 g/m$^2$.

Preparation Example 2. Preparation of Second Fibrous Layer

After mixing 70% by weight of polyethylene terephthalate (PET) and 30% by weight of a binder fiber, an air laid process was performed on the mixture to produce a second fibrous layer having an areal density of 1200 g/m$^2$.

Preparation Example 3. Preparation of Adhesive Member

Polyethylene (PE), polyamide (PI), and polyethylene (PE) were laminated and pressed to prepare an adhesive member in the form of a three-layer film having a thickness of 50 μm.

Example 1. Preparation of Sound Absorbing Member

The first fibrous layer, the second fibrous layer, and the adhesive member prepared in Preparation Examples 1 to 3 were mounted in a hot forming mold without being preheated. Then, the upper mold was heated to 50° C. and a vacuuming process was performed for 45 seconds. At the same time, a steaming process was performed such that the lower mold was heated to 180° C., and then steam of 150° C. was applied at a pressure of 3 bar for 10 seconds, and then a vacuuming process was performed for 10 seconds. Next, another steaming process was performed such that steam of 150° C. was applied at a pressure of 3 bar for 5 seconds, and then another vacuuming process was performed. Thus, a sound absorbing member with a double layer structure shown in FIG. 3 was obtained.

Comparative Example 1. Preparation of Sound Absorbing Member

As shown in FIG. 4, first, a second fibrous layer was preheated in a hot air oven at 180° C. for about 80 seconds and then pressed and molded in a cold forming machine at 25° C. for 50 seconds. The molded second fibrous layer was placed in a cold forming mold having a temperature of 25° C. The first fibrous layer and the adhesive member were preheated for about 80 seconds in a hot air oven at 180° C., and then laminated on the second fibrous layer and pressed for 60 seconds to prepare a sound absorbing member having a double layer structure shown in FIG. 5.

Experimental Example 1. Sound Absorption Performance Evaluation

An experiment was conducted according to ISO 10354-2 using a vertical incident sound absorption coefficient tester (Two-microphone Impedance Measurement Tube) to evaluate the sound absorption performance of the sound absorption member of Example 1.

The sound absorption performance was measured from the side of the first fibrous layer of the sound absorption member, and the results are shown in Table 1 and FIG. 6.

TABLE 1

| Frequency (Hz) | Comparative Example 1 | Example 1 |
|---|---|---|
| 400 | 0.19 | 0.35 |
| 500 | 0.19 | 0.39 |
| 630 | 0.20 | 0.43 |
| 800 | 0.21 | 0.44 |
| 1,000 | 0.22 | 0.44 |
| 1,250 | 0.23 | 0.44 |
| 1,600 | 0.31 | 0.48 |
| 2,000 | 0.33 | 0.51 |
| 2,500 | 0.29 | 0.41 |
| 3,150 | 0.30 | 0.37 |
| 4,000 | 0.38 | 0.40 |
| 5,000 | 0.51 | 0.52 |

Referring to Table 1 and FIG. 6, it was confirmed that the sound absorbing member of Example 1 was significantly superior to the sound absorbing member of Comparative Example 1 at all frequencies. Therefore, it was found that the surface damage of the first fibrous layer attributable to heating affects the sound absorption performance.

Although the exemplary embodiments described herein and the configurations illustrated in the drawings are presented for illustrative purposes and do not exhaustively present the technical spirit of the present disclosure. Accordingly, it should be appreciated that there will be various equivalents and modifications that can replace the exemplary embodiments and the configurations at the time at which the present application is filed. Therefore, it should be understood that the above-described embodiments are considered to be illustrative in all respects but are not considered as to be restrictive. The scope of the present disclosure should be defined by the appended claims rather than the foregoing description, and all changes or modifications that can be derived from the meaning, scope, and equivalent concept of the claims should be construed as falling within the scope of the present disclosure.

The invention claimed is:

1. A method of producing an automobile sound absorbing member through molding, the method comprising:
    (a) preparing a first fibrous layer and a second fibrous layer;
    (b) providing an adhesive member between the first fibrous layer and the second fibrous layer and placing an aggregate of the first fibrous layer, the adhesive member, and the second fibrous layer in a molding machine; and
    (c) pressing the aggregate with an upper mold and a lower mold of the molding machine so that the first fibrous layer and the second fibrous layer are bonded and molded at the same time,
    wherein in step (a), each of the first fibrous layer and the second fibrous layer comprises 50% to 95% by weight of at least one base fiber selected from polyethylene terephthalate, polypropylene, polyacrylate, nylon and cotton and 5% to 50% by weight of a binder fiber having a melting point of 200° C. or below, the first fibrous layer has an areal density in a range of 600 to 1400 g/m$^2$, the second fibrous layer has an areal density in a range of 600 to 2000 g/m$^2$, and the second fibrous layer consists of a vertical fiber having a verticality of about 40° to 90°,
    wherein in step (c), the upper mold and the lower mold perform different processes, respectively, such that the lower mold performs a steaming process and a vacuuming process at least two times, and, in the steaming process, steam or hot air of 100° C. to 200° C. is supplied for 5 to 15 seconds at a pressure of 1 to 5 bar.

2. The method of claim 1, wherein in step (b), the adhesive member is composed of at least one layer, comprises at least one material selected from polyethylene, polypropylene, ethylene vinyl acetate copolymer, polyamide, and low-melting-point polyethylene terephthalate, and has a thickness in a range of 30 to 200 μm.

3. The method of claim 1, wherein in step (c), the upper mold performs a vacuuming process for 40 to 50 seconds under a temperature condition of 10° C. to 100° C.

4. The method of claim 1, wherein the vacuuming process is performed for 1 to 15 seconds under a temperature condition of 100° C. to 200° C.

5. The method of claim 1, wherein after step (c), (d) trimming is performed after removing moisture remaining on the surface of a molded body manufactured by the molding machine.

\* \* \* \* \*